United States Patent [19]

Jen

[11] Patent Number: 4,691,150
[45] Date of Patent: Sep. 1, 1987

[54] MOTOR SPEED CONTROLLER

[75] Inventor: Tai-Kuang Jen, Ithaca, N.Y.

[73] Assignee: NCR Corporation, Dayton, Ohio

[21] Appl. No.: 876,575

[22] Filed: Jun. 20, 1986

[51] Int. Cl.⁴ .............................................. G05B 5/00
[52] U.S. Cl. .................................. 318/331; 318/317; 318/326
[58] Field of Search ............... 318/331, 315, 317, 561, 318/603, 309, 310, 311; 400/124

[56] References Cited

U.S. PATENT DOCUMENTS

| 3,599,064 | 8/1971 | Friedman | 318/331 |
| 3,617,844 | 11/1971 | Giygera | 318/331 |
| 3,775,653 | 11/1973 | Peterson | 318/331 |
| 3,936,711 | 2/1976 | Gay | 318/331 |
| 3,947,737 | 3/1976 | Kimura | 318/331 |
| 4,078,193 | 3/1978 | Anderson | 318/317 |
| 4,204,777 | 5/1980 | Jen | 400/322 |
| 4,280,082 | 7/1981 | Achaiya | 318/341 |
| 4,394,604 | 7/1983 | Brecy | 318/331 |
| 4,510,423 | 4/1985 | Iwasawa | 318/331 |
| 4,556,830 | 12/1985 | Schwalm | 318/331 |
| 4,567,409 | 1/1986 | Ogawa | 318/317 |
| 4,580,082 | 4/1986 | Guerin-Pinaud | 318/331 |

Primary Examiner—William M. Shoop, Jr.
Assistant Examiner—Patrick C. Keane
Attorney, Agent, or Firm—Wilbert Hawk, Jr.; Edward Dugas

[57] ABSTRACT

A matrix print head drive motor is controlled in speed with a long term and a short controller. The short term controller maintains the speed of the drive motor at a relative constant for a range of torque loadings. When the torque range shifts, the long range controller shifts the response range of the short term controller so as to maintain the speed of the drive motor substantially constant.

6 Claims, 3 Drawing Figures

FIG. 2

| 3-BIT OUTPUTS | | | SUMMING VOLTAGE | SPEED |
|---|---|---|---|---|
| SPEED/1 | SPEED/2 | SPEED3/ | Vr (VOLTS) | (MSEC) |
| 0 | 0 | 0 | 1.326 | 470 |
| 1 | 0 | 0 | 1.292 | 484 |
| 0 | 1 | 0 | 1.257 | 507 |
| 1 | 1 | 0 | 1.220 | 520 (PRE-SET) |
| 0 | 0 | 1 | 1.191 | 532 |
| 1 | 0 | 1 | 1.154 | 545 |
| 0 | 1 | 1 | 1.119 | 558 |
| 1 | 1 | 1 | 1.082 | 565 |

MOTOR SPEED CONTROLLER

BACKGROUND OF THE INVENTION

In the field of matrix printers, it is of course well known that a printer may include one or more print heads which are caused to be moved in a reciprocating manner across the printer for printing in a serial manner. The print head may be moved by a cable and pulley arrangement, a lead screw, or a cam drive or like drive mechanism. Each of the print heads includes a plurality of elements supported in a group and actuated or energized at high speed to cause printing of dots by the movement of dot-making elements, including droplets of ink or print wires attached to solenoids which are caused to be impacted against the paper. The print wires or ink jet nozzles are usually spaced vertically so as to print the dots making up the characters in a line as the print head is moved across the printer. In this manner, a line of printed characters is completed upon travel of the print head in one direction across the paper.

Another form of matrix printer includes the use of a plurality of printing elements supported from a carriage in a manner wherein the elements are aligned horizontally across the printer and upon each pass of the carriage respective dots of characters are printed in a line or row and subsequent passes of the carriage and printing elements cause additional lines of dots to be printed to complete the dot matrix characters along the line of printing. Common arrangements include the use of four or eight printing elements supported from the carriage.

A timing strip with slots or like indicia is commonly used to originate the actuation of the printing elements wherein one or more sensors sense the slots or other indicia to print dots in precise columns across the paper. While the printing has usually been performed in one direction, for example, left to right, more recently the printing has been done in both directions of travel of the print head carriage or of the printing element carriage.

The speed of the motor driving the print head influences the location of each print dot that forms a matrix of dots creating a character. The motor's speed is in turn influenced by the amount of torque applied to the motor's input shaft, the temperature, the humidity, mechanical wear and other miscellaneous factors. Motor speed controllers are used to attempt to maintain the speed of the motor at a relative constant to insure quality printing, but it has been determined that speed controllers generally can only control speed within a limited range and when the loading on the motor exceeds this range, the motor's speed is not accurately controlled.

It therefore is desirable to have a motor speed controller which can accommodate a shift in the loading range of a motor so as to maintain the motor's speed substantially constant.

A patent of interest for its showing of a printer of the type wherein the present invention finds particular utility is U.S. Pat. No. 4,204,777 entitled "Matrix Printer Control System", by T-K Jen the inventor of the present invention.

The printer of this patent is of the type wherein printing is performed in each direction of travel of the print head and each dot of the printed characters must be deposited or positioned at the same column location for that particular dot in each direction of printing. The quality of the motor speed controller for this type of printer will bear a direct relationship upon the alignment of the dots in the printed characters.

Another patent of interest is U.S. Pat. No. 4,208,137 entitled "Position Sensing for Matrix Printer", by C. H. Liu. In this patent, the aforementioned printer of T-K Jen is improved with, among other things, a back electromotive force direct current motor speed control circuit.

Another motor speed controller of interest is disclosed in U.S. Pat. No. 4,280,082 entitled "Digital DC Motor Speed Control Circuit", by R. M. Acharya et al. This patent is assigned to NCR Corporation as are the two preceding referenced patents and the present application. The speed control circuit of this patent maintains the speed of a high current DC motor at a constant speed over a varying supply voltage and varying torque loads. The speed of the motor is controlled by adjusting the width of motor voltage pulses as a function of the speed of the motor and the level of the motor supply voltage such that the voltage pulses have a proportionally larger width for a smaller level of motor supply voltage or for a decrease in the amount of motor shaft speed and a proportionally narrower width for increased levels of motor supply voltage or for an increase in the amount of motor shaft speed.

SUMMARY OF THE INVENTION

In the present invention, there is provided a short term controller which is analog in nature and which uses the back electromotive force, EMF, of the motor to regulate the current supplied to the motor as a function of the torque applied to the motor. The torque applied to the motor normally varies between 0.5 to 1.5 oz.-in. at a printing speed of 520 ±15 milliseconds or stated another way, the current supplied to the motor is regulated to between 220 to 460 milliamp in response to the applied torque in order to maintain the printing speed substantially constant at 520 ±15 milliseconds. Also provided is a long term controller, which is digital to analog in nature, and which provides a reference voltage to the short term controller to accommodate a shift in the torque range that the short term controller can accommodate. The long term controller provides the reference voltage in response to signals that are a function of the time that it takes for the printer carriage to move through one cycle. If the time exceeds a predetermined upper level, one-bit will be deleted from three-bits that are applied to the long term controller to cause an increase in the reference voltage applied to the short term controller. If the time is less than a predetermined lower level, one-bit will be added to the three-bits applied to the long term controller to cause a decrease in the reference voltage applied to the short term controller.

Accordingly, it is a primary object of the present inventions to provide an improved motor speed controller.

It is another object of the present to provide a motor speed controller which incorporates a short term and a long term controller to dynamically adjust the range of effective speed control.

These and other objects of the present invention will become more apparent when taken in conjunction with the following description and drawings wherein like characters indicate like parts and which drawings form a part of the present application.

BRIEF DESCRIPTION OF THE DRAWINGS

FIG. 2 is a table illustrating the range of 3-bit signals as a function of the reference voltage and motor speed.

DESCRIPTION OF THE PREFERRED EMBODIMENT

Figure 1A:
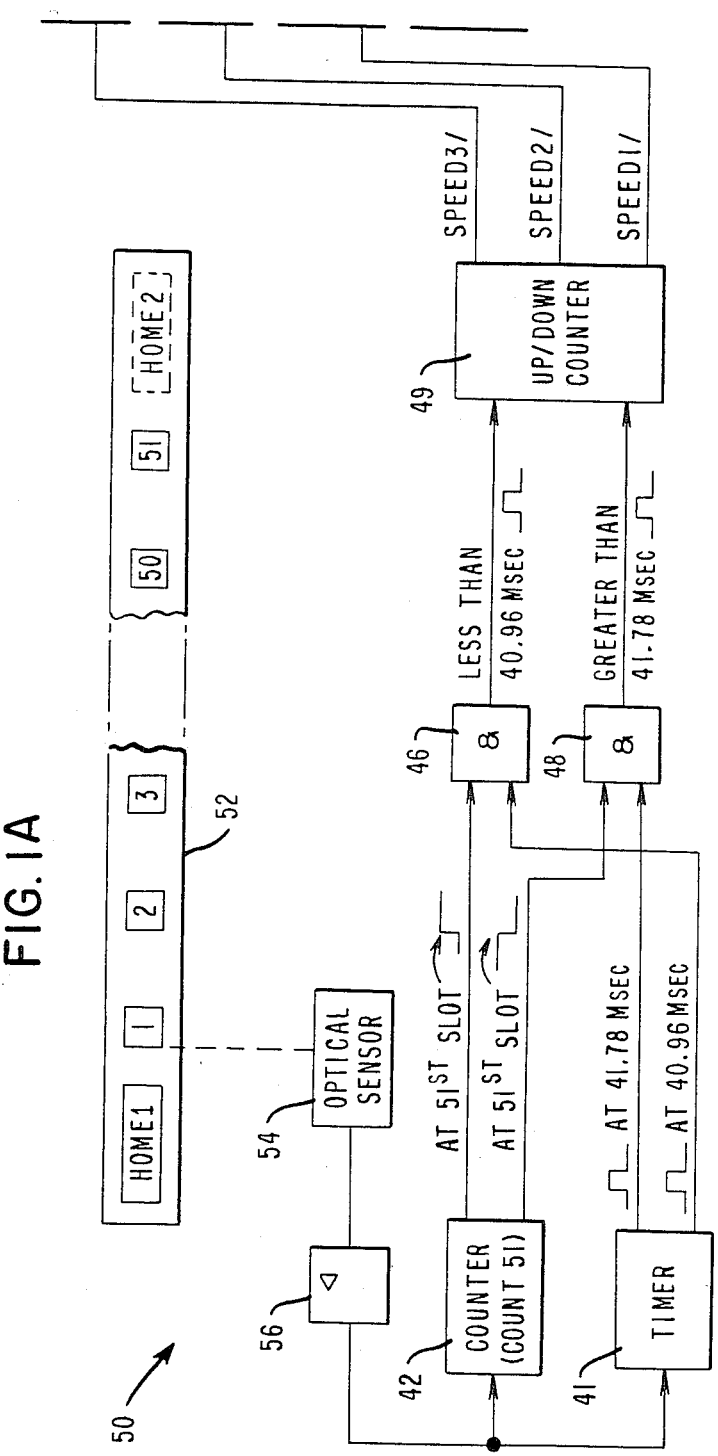
FIGS. 1A and 1B illustrate in electrical block and schematic diagram form the preferred embodiment of the invention.
Figure 1B:
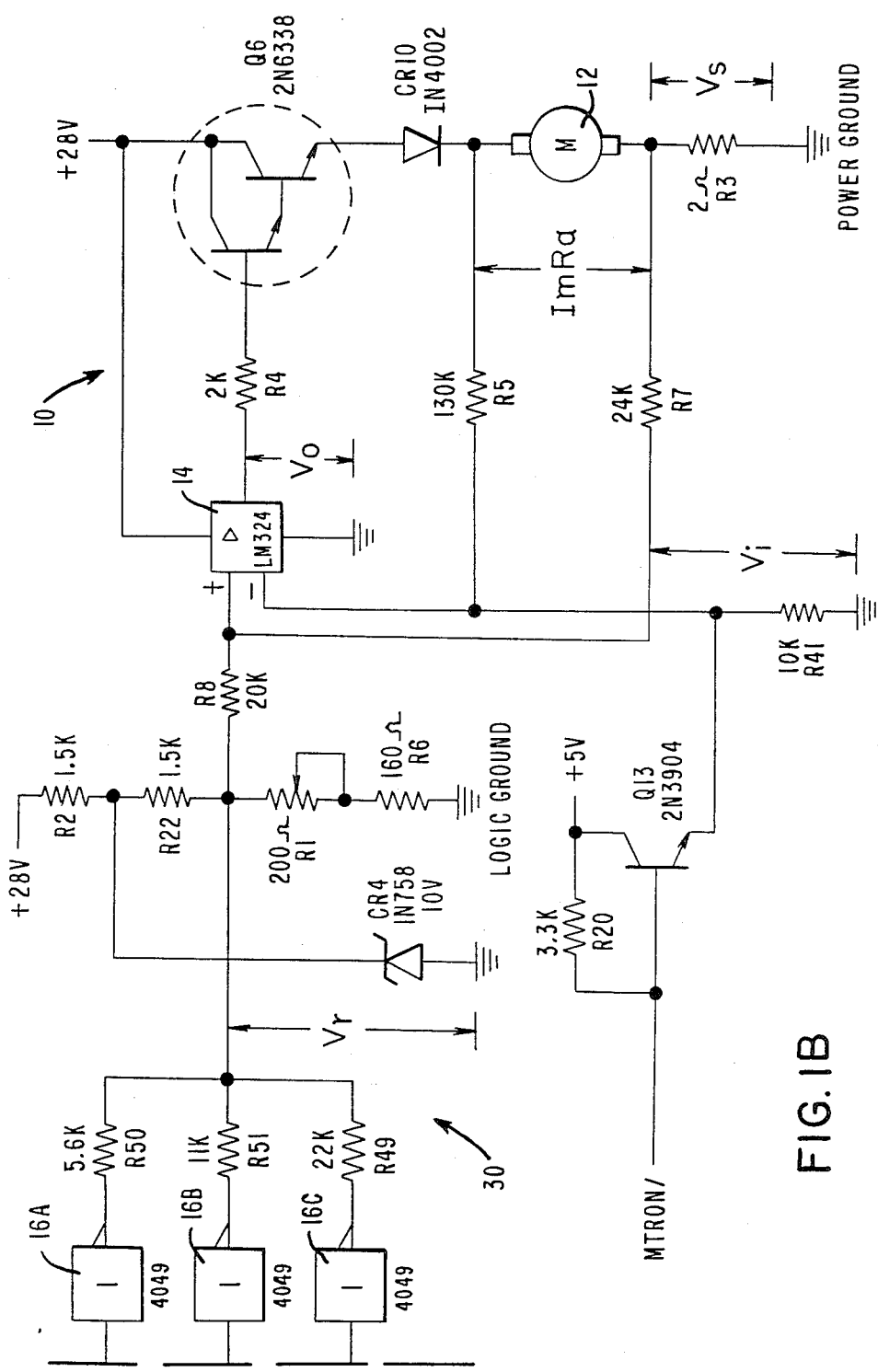

Referring now to the FIGS. 1A and 1B and particularly to FIG. 1B, a DC matrix printer motor 12 is connected to a +28 volt DC supply by means of a Darlington power transistor pair Q6 and a diode CR10. The current path through the DC motor is completed by a load current sensing resistor R3 which connects the motor to a power ground. An operational amplifier 14 has its non-inverting or plus input connected to sense the voltage $V_s$ generated at the junction of the motor 12 and the resistor R3 by resistor R7. The inverting or negative input to the operational amplifier 14 is coupled to ground via resistor R41 and to the junction of the motor and diode CR10 by resistor R5. The output of the operational amplifier is a voltage denoted $V_0$ which is directed to the base of the Darlington transistor Q6 via resistor R4. Power for the operational amplifier is obtained from the +28 volt supply. A MTRON/ signal is applied to the negative input of the operational amplifier 14 via transistor Q13. The collector of transistor Q13 is connected to a +5 volt source. The base is connected to the +5 volt source via resistor R20 and receives the signal MTRON/. The circuit thus far recited constitutes a short term controller 10 which operates by using the motor's back EMF to regulate the motor's speed. When a torque load is sensed on the motor's shaft, the armature current through the motor increases which elevates the voltage $V_s$. This elevation, in turn, increases the input voltage $V_i$ to cause the operational amplifier's output voltage $V_0$ to go up. The voltage $V_0$ is equal to $V_i(1+(R5/R41))$. As a result of this increase there is a compensation for the lost back EMF due to the ImRa drop in the motor current, where Ra is the armature resistance of the motor. This drop is thus compensated for and the result is to restore the motor speed back to normal.

When first operated the system is initialized to a nominal print head speed which causes the print head to move end to end along a print line in 520 milliseconds. In the preferred embodiment of the invention, it was found that the motor had to overcome torque changes that varied between 0.5 to 1.5 oz.-in. while maintaining the nominal printing speed within 520 milliseconds, plus or minus 15 milliseconds. The short term controller is adjusted to the nominal (preset) speed by adjusting the reference voltage developed at a potentiometer R1. The positive terminal of the operational amplifier 14 is connected to sense the voltage developed by the potentiometer R1 via resistor R8 which is connected to potentiometer R1 at the junction of a voltage dividing circuit formed by the series connection of resistors R2, R22, R1 and R6 between a +28 volt supply and ground. A 10 volt Zener diode CR4 maintains the voltage at the junction of resistor R2 and R22 at a relative constant. This ensures that absence any other influences that fluctuations in the +28 volt supply do not materially affect the voltage present at the juncture of potentiometer R1 and resistor R22.

The long term controller 30 is shown operating upon three speed signals labeled SPEED 1/ through SPEED 3/. Each of these signals is applied to an associated CMOS inverter gate labeled 16A through 16C. The output of inverter gate 16A is coupled to the juncture of resistors R1 and R22 by resistor R50. In a like manner, the output of inverter gate 16B is coupled to the juncture by a resistor R51 and the output of the inverter gate 16C is coupled to the juncture by a resistor R49. The SPEED 1/ through SPEED 3/ signals constitute a three-bit binary signal with one-bit associated with each SPEED signal.

Referring now to FIG. 2, there is illustrated in table form the three-bit outputs, SPEED 1/-SPEED 3/, which are received at the input of the CMOS inverter gates. For each of the binary bit codes shown, there is a corresponding summing of the voltage values developed at the juncture of the three resistors R50, R51 and R49, which voltage is denoted $V_r$. For the values of the voltage $V_r$, there is a corresponding speed column indicating the speed of the print head in response to that particular value of $V_r$. For an example, with the three-bit signal being a 000, the voltage $V_r$ will equal 1.326 volts which corresponds to a normal torque load speed of 470 milliseconds. On the high end of the scale with a three-bit output of 111, a voltage $V_r$ equal to 1.082 volts will be generated which in turn, will cause the print head speed to be 565 milliseconds. As can be seen thus far in the description, the voltage $V_r$ establishes a central operating print head speed and the short term controller maintains the speed by combining the voltage $V_i$ with the voltage $V_r$.

Referring back to FIG. 1A, the three-bit signal may be generated using a timing strip 52, having character print positions numbered 1 through 51, and a Home 1 and a Home 2 position which are sensed by an optical sensor 54 as the print matrix moves from left to right and from right to left in its printing operation. The output signal from the optical sensor consisting of 51 pulses occurring as a block with the spacing between the pulses (pulse rate) being a function of the speed of the motor, is directed to an operational amplifier 56 for amplification and thence to a counter 42 and a timer 41. The counter 42 is adjusted to count to 51, corresponding to the 51 print positions in a line of print and to provide two outputs; one, a rising pulse on the occurrence of the 51st count and the other a complementary falling pulse. Each of these signals is directed to an associative input of an AND gate 46 and an AND gate 48. The timer 41, which is started at the Home 1 position, measures the elapsed time to travel between the Home 1 and the Home 2 positions. A pulse is provided on one output when the elapsed time is 41.78 milliseconds. That pulse is applied to an input of the AND gate 48. A pulse is provided on another timer output when the elapsed time is 40.96 milliseconds. The pulse is applied to an input of the AND gate 46. The output signal from the AND gate 46 is a positive pulse, which occurs when the elapsed time for transporting the matrix head between the Home 1 and the Home 2 positions is less than 40.96 milliseconds. In a like manner, the output signal from the AND gate 48 is a pulse when the time to transport the head between the Home 1 and the Home 2 positions is greater than 41.78 milliseconds. An up/down counter 49 receives these inputs from the AND gates 46 and 48. The up/down counter is pre-set to bits 1, 2 and 3 being 110. Bits 1, 2 and 3 correspond to the signals SPEED 1/, SPEED 2/ and SPEED 3/, respectively. The upper count limit of the up/down counter is 111. The lower limit of the counter is 000. A pulse input corresponding to a less than 40.96 millisecond signal causes the up/down counter to count up. An input corresponding to a greater than 41.78 millisecond signal causes the up/down counter to count downwards. In this manner, the counter output causes the three-bit output, shown in FIG. 2, to be generated.

In the preferred embodiment of the invention, when the printer starts to print, the signal MTRON/ goes from high to low. This in turn, causes the transistor Q13 to be turned off and the negative input of the operational amplifier to go low. The motor 12 is then turned on causing the matrix print head carriage to start to cycle. A cycle is equal to the transition between the Home 1 and Home 2 positions and also the Home 2 to the Home 1 positions. For a seven dot character, the carriage head cycles nine times. During the first cycle (i.e., from cycle one to cycle two), the time duration between the Home 1 and the Home 2 position is measured as previously discussed. If the duration is too long, the system operates to subtract one-bit from the SPEED 1/, SPEED 2/, and SPEED 3/ three-bit output. If the duration is too short, the system will add one-bit into the three-bit output. Once the speed has been regulated, the printing takes place on cycles two through eight. The printer is stopped at the ninth cycle by the MTRON/ signal going from low to high. If it is desired to print a 9-dot character, the number of cycles are increased from a nine to eleven to permit the speed adjustment to be made during the time necessary to travel between the home positions during the first to the second cycle.

From the foregoing, it can be seen that the system thus described is a long term and a short term motor speed control. The short term controller operates to maintain the motor at a substantially constant speed as long as input shaft torque loadings remain within the design range. If the loading moves from that range, the long term controller performs an adjustment which shifts the response range of the short term controller so that the motor speed remains within the designed tolerance.

Therefore, while there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

I claim:

1. A controller for controlling the speed of a DC motor to which a variable torque is applied comprising:
   a DC motor having first and second inputs for receiving power;
   a short term controller having;
   (i) a power transistor and a diode serially connecting a source of power to said first input of the DC motor, a load current sensing resistor connecting said second input of the DC motor to a power ground,
   (ii) an operational amplifier having one input connected to said first input of the DC motor and a second input connected to said second input of the DC motor for providing an output signal which compensates for a drop in motor current, said one input adapted for receipt of a reference signal; and
   a long term controller for generating the reference signal for said short term controller as a function of the deviation of the speed of the DC motor from a reference speed having;
   (i) means for converting the speed of the DC motor to a series of pulses the spacing of which corresponds to the motor's speed,
   (ii) counting means for receiving the series of pulses and for counting a fixed number of pulses and for providing a signal upon said counter having counted the fixed number of pulses,
   (iii) timer means commencing its timing upon the occurrence of a first pulse in the series of pulses for providing a first signal corresponding to a time which exceeds the reference speed of the DC motor and a second signal corresponding to the time which is less than the reference speed of the DC motor,
   (iv) a logic means connected to receive the provided signal from said counter and said first and second signals from said timer means for providing a less than signal if the counter provided signal occurs at a time which is less than the reference speed of the DC motor and a greater than signal if the counter provided signal occurs at a time which is greater than the reference speed of the DC motor,
   (v) up/down counter means responsive to the occurrence of the less than signal and the greater than signal for providing a three-bit output signal which is a function of the occurrences of said greater than or less than signal, and
   (vi) summing means for providing said reference signal as a function of the three-bit output signal.

2. The controller according to claim 1 and further comprising;
   means coupled to said one input of said short term controller for providing a fixed component to said reference signal for achieving an initial adjustment to the motor speed.

3. The controller according to claim 1 wherein said summing means is comprised of:
   three inverters each having an input and an output, each input connected to receive one bit from said up/down counter; and
   three resistors each connecting the output of a respective inverter to the one input of said operational amplifier.

4. A motor speed controller comprising:
   an electrical motor;
   a source of current coupled to said motor;
   an analog short term controller responsive to one range of applied motor torque coupled to said motor and to said source of current for regulating the current supplied to said motor as a function of the torque applied to said motor so as to maintain the speed of said motor at a reference speed when the applied torque is within the one range of applied motor torque;
   a digital long term controller coupled to said short term controller for compensating for a shift in the one range of applied motor torque by providing a reference voltage to the short term controller to shift its response range as a direct function of the shift in the torque range so as to maintain the speed of said motor at the reference speed, said digital long term controller commmprised of;

pulse means for providing blocks of pulses each having a pulse rate that is a function of the speed of said motor;

counter means responsive to said pulse means for counting the occurrence of the pulses in a block of pulses and for providing an output signal when said counter reaches a count corresponding to the last pulse in a block of pulses;

timing means responsive to the occurrence of a first pulse in a block of pulses and providing a first gating signal after the expiration of a lower time limit and for providing a second gating signal after the expiration of an upper time limit;

logic means receiving said first and second gating signals and the output signal from said counter means for providing a greater than signal when the time to count the number of pulses in said block of pulses exceeds the time corresponding to the reference speed of said motor and for providing a less than signal when the time to count the number of pulses in said block of pulses is less than the time corresponding to the reference speed of the motor;

an up/down counter means having inputs coupled to said logic means for providing a digital signal representative of the amount of time that the motor speed deviates from the reference speed; and means coupling said up/down counter to said short term controller for providing the reference voltage.

5. The motor speed controller according to claim 4 wherein said up/down counter means provides three-bit binary output signals indicative of the deviation of said motor speed from a preset reference speed, and further comprising, means for summing the three-bit binary outputs to generate a voltage level signal indicative of the value of said three-bit binary output signals.

6. The motor speed controller according to claim 5 wherein said means for summing is comprised of:

three inverters each having an input and an output, each input connected to receive one bit from said up/down counter; and three resistors each connecting the output of a respective inverter to said short term controller.

* * * * *